United States Patent [19]
Kirby

[11] Patent Number: 5,886,629
[45] Date of Patent: Mar. 23, 1999

[54] TOOL FOR USE WITH TELECOMMUNICATIONS MODULES

[75] Inventor: Henry Kirby, Waterford, United Kingdom

[73] Assignee: Northern Telecom Limited, Montreal, Canada

[21] Appl. No.: 838,608

[22] Filed: Apr. 10, 1997

[30] Foreign Application Priority Data

Apr. 15, 1996 [GB] United Kingdom .................. 9607765

[51] Int. Cl.⁶ .............................. G08B 26/00; G06F 7/04
[52] U.S. Cl. .................... 340/505; 340/539; 340/573; 340/680; 340/825.31; 340/825.54
[58] Field of Search .................... 340/505, 539, 340/573, 680, 825.23, 825.54, 825.69, 825.72, 825.31

[56] References Cited

U.S. PATENT DOCUMENTS

| | | |
|---|---|---|
| 4,442,426 | 4/1984 | Heuschmann et al. .................. 340/539 |
| 4,593,155 | 6/1986 | Hawkins ................................ 340/825.5 |
| 4,860,336 | 8/1989 | D'Avello et al. ........................ 379/111 |
| 4,906,972 | 3/1990 | Spencer ................................... 340/539 |

*Primary Examiner*—Donnie L. Crosland
*Attorney, Agent, or Firm*—John D. Crane

[57] ABSTRACT

A tool for use in manipulating telecommunications modules comprises a housing having a grip, engagement means for engaging with a module so as to securely grasp the module and a transmitter/receiver unit for transmitting signals to and receiving information from the module. Information received from the module is displayed on the tool. The tool also has a control for allowing a user to request decommissioning of the module to which it is engaged, the tool being arranged to receive a reply from a module indicating that decommissioning is complete. Preferably an interlock mechanism couples an unlocking control on the tool to a key, the interlock inhibiting key until receiving the reply from the module indicating that decommissioning is complete. The tool can also be used to configure a module.

10 Claims, 7 Drawing Sheets

TOOL FOR USE WITH TELECOMMUNICATIONS MODULES

TECHNICAL FIELD

This invention relates to a tool for use in manipulating telecommunications modules.

BACKGROUND OF THE INVENTION

In telecommunications installations it is common to find a set of electronics modules, the modules being held in a rack or similar device which provides mechanical support, a power supply and interconnection of signals between the modules.

The modules provide various functions, such as interfacing to a high-capacity optical link, a cross-connect (switching) function, or interfacing to subscriber lines. Building an installation in the form of modules allows simpler upgrades or repairs of the installation, with just those parts of the installation requiring change being affected.

A problem with telecommunications installations is that of replacing modules when they fail or when they need to be upgraded. In a large installation where there are tens or hundreds of similar modules, it can be difficult to properly identify the module which needs replacing. It is a common problem for incorrect modules to be temporarily withdrawn from their support frame in error, or for incorrect modules to be replaced. This leads to calls which are in progress at the time of the module removal being 'dropped' and periods when this equipment cannot be used. Such events are often called outages. Incorrect removal of modules is the reason for a significant proportion of outages in networks. There is a need to minimise such outages, particularly as telecoms operators are bound by strict regulations which protect consumers by enforcing a maximum permissible level of outages.

Labelling of modules as an aid to identification is often ineffective. Labelling becomes dirty or damaged with age. Labels may also be incorrect, where modules have been upgraded or boards inside the module casing have been replaced. It may also be undesirable to label a module so as not to draw attention to it; for example, a module which carries calls from a particularly sensitive part of an organisation.

SUMMARY OF THE INVENTION

The present invention seeks to provide a tool to aid a technician in manipulating modules. The present invention also seeks to minimise disruption to a network caused by incorrect removal of modules.

According to one aspect of the present invention there is provided a tool for use in manipulating telecommunications modules, the tool comprising a housing having a grip for allowing a user to grasp the tool, engagement means for engaging with a module so as in use to securely grasp the module and a transmitter/receiver unit for transmitting signals to and receiving information from the module.

Preferably the tool has a display for displaying the information received from the module.

Preferably the modules are adapted to lock to a support structure, the tool further comprising means to lock or unlock the module to which it is engaged from the support structure.

Preferably the tool further comprises a control for allowing a user to request decommissioning of the module to which it is engaged, the tool being arranged to receive a reply from a module indicating that decommissioning is complete. This allows a user to check whether it is safe to remove a module.

Preferably the tool has an unlocking control, a key which is adapted to engage with a module, and an interlock mechanism which is operable to inhibit the key until receiving the reply from the module indicating that decommissioning is complete, whereupon the interlock is released to allow the user to unlock the module and remove it from the support structure, According to another aspect of the invention there is provided a method of manipulating a telecommunications module, which module is mounted on a support structure, using a tool comprising a housing having a grip for allowing a user to grasp the tool, engagement means for engaging with the module so as to securely grasp the module and a transmitter/receiver unit for transmitting signals to and receiving information from the module, the method comprising:

fitting the tool to the module;

requesting, via a control on the tool, decommissioning of the module;

receiving a reply from the module indicating that decommissioning is complete; and, removing the module from the support structure.

According to a further aspect of the invention there is provided a method of manipulating a telecommunications module, which module is adapted to mount on a support structure, using a tool comprising a housing having a grip for allowing a user to grasp the tool, engagement means for engaging with the module so as to securely grasp the module and a transmitter/receiver unit for transmitting signals to and receiving information from the module, the method comprising:

fitting the tool to the module;

mounting the module on the support structure; and, configuring the module by transmitting configuration information to the tool via the transmitter/receiver unit.

BRIEF DESCRIPTION OF THE DRAWINGS

An embodiment of the invention will now be described, by way of example only, with reference to the accompanying drawings in which.

DESCRIPTION OF PREFERRED EMBODIMENTS

Figure 1:
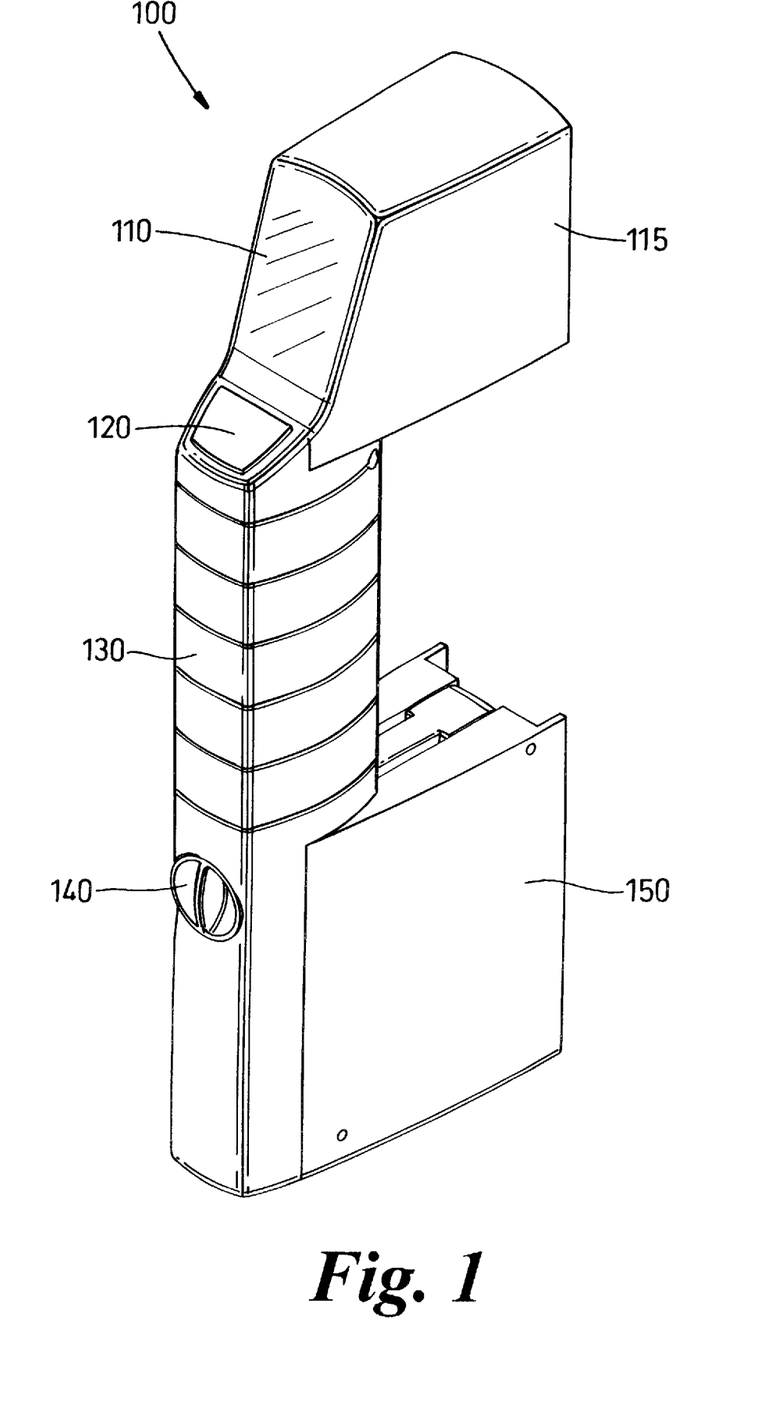
FIG. 1 is a front perspective view of the tool.
Figure 2:
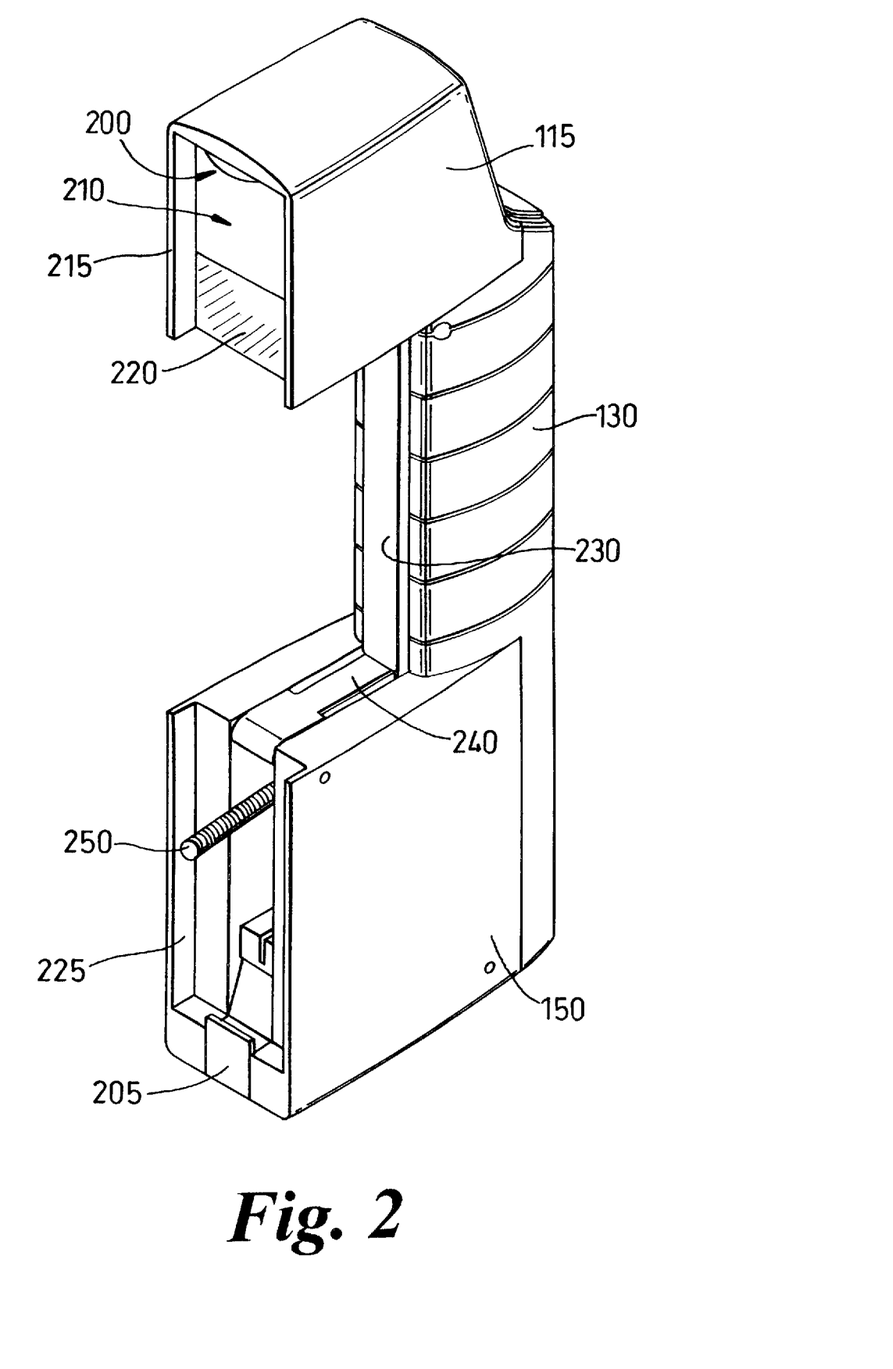
FIG. 2 is a further perspective view of the tool.

FIGS. 1 and 2 show a tool for use in manipulating and identifying telecommunications modules. FIG. 1 is a front perspective view of tool 100, showing the controls which a user may operate. FIG. 2 is a perspective view of the rear, module-facing side of the tool, showing some of the mechanical features which allow the tool to mate with a module. The tool is of a height at least as great as that of a module to which the tool is to be coupled. The tool housing is preferably formed of a robust material such as a plastics material which will withstand use by a technician in the field. An upper section 115 of the tool houses electronic circuitry to support interrogation of a module and a display 110 is mounted on the front of the tool. One or more buttons 120 are provided to allow a user to request particular operations. Control 140 allows a user to operate a key 250 which extends from the module-facing side of the tool. Section 130 provides a handgrip to allow a user to grasp the tool.

Plate 220 on the module-facing side of the tool covers transmit/receive sensors which support a communication link between the tool and a module.

The coupling mechanism which allows the tool to be coupled to a module will now be described with reference to FIGS. 2 to 4. Upper section 115 of the tool housing has a hood section 215 to aid alignment with a module and a downwardly extending projection 200 to engage with a complementary depression 410 on the upper face of a module.

Lower section 150 of the tool housing has an upwardly extending projection 205 which is carried on part 300. Projection 205 is of a size and shape to fit a complementary depression 420 on a lower face of a module. Projection 205 and part 300 is movable between an engaged position (as shown in FIGS. 2 and 4) and a retracted position (as shown in FIG. 3) in which projection 205 is retracted sufficiently to allow the tool to be fitted to or removed from a module.

Figure 3:
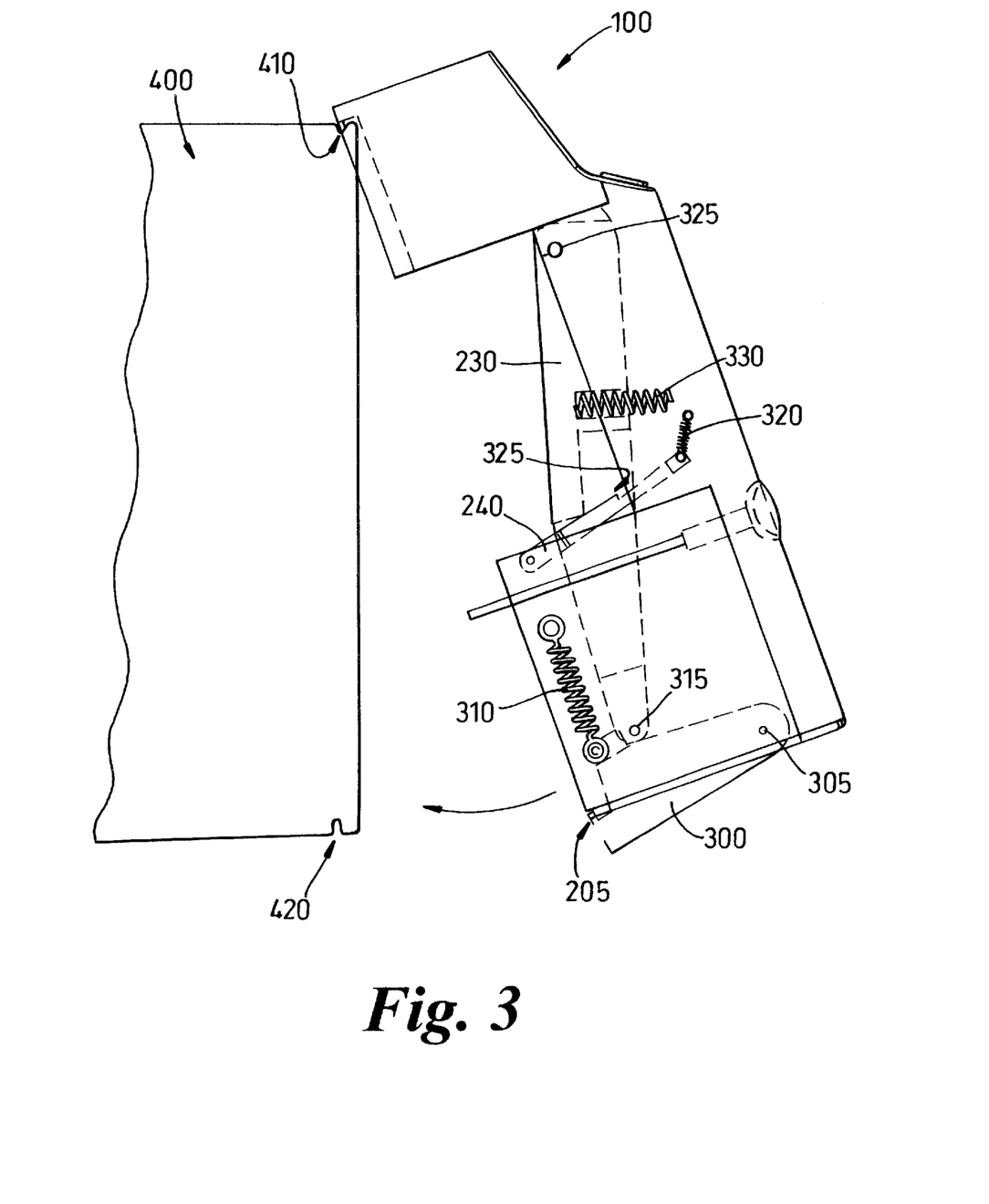
FIG. 3 is a side view of the tool of FIGS. 1 and 2 being fitted to a module.
Figure 4:
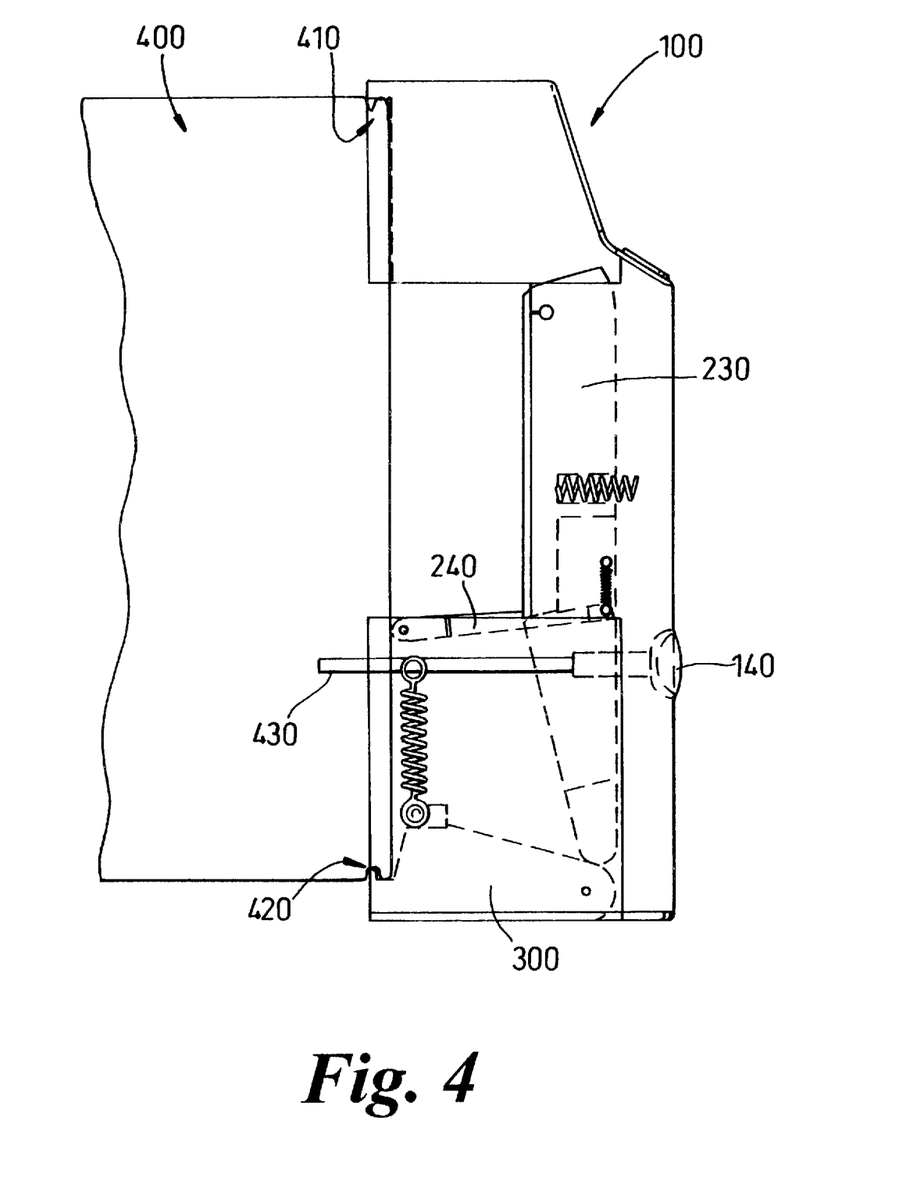
FIG. 4 is a side view of the tool fitted to a module.

The main components of the latching mechanism are best shown in the partly sectional views of FIGS. 3 and 4. Projection 205 is carried by part 300, which is pivotally mounted about pivot 305. A spring 310 is attached to part 300 to bias it in an engaged position. Trigger part 230 is pivotally mounted about pivot 325 and biased by spring 330. The lower portion of the trigger has a roller 315 which allows the trigger to roll along the upper surface of part 300. The shape of the upper surface of part 300 and the position of pivot 305 are selected such that the movement of trigger 230 as the trigger is squeezed causes projection 205 to raise or lower. Locking pawl 240 is also pivotally mounted and biased by spring 320. This part has a stepped section 325 which, in the engaged state (shown in FIG. 4) retains trigger 230.

The procedure for coupling the tool to a module will now be described. Firstly the tool is prepared for fitting to a module by depressing locking pawl 240, thereby releasing trigger 230 and lowering part 300 and hence projection 205. With the tool prepared, it is aligned with the face plate of module 400, seating projection 200 on the upper part of the tool in complementary depression 410 on the upper face of module 400. Part of the hood section 215 of the tool fits over the face plate of the module and aids location of the tool on the module. This is the state shown in FIG. 3. The tool is then pivoted about this upper mounting until lower section 150 of the tool is seated against the lower portion of the module's face plate. Again, a hooded section 225 of the tool aids alignment with the module. Trigger 230 is squeezed to allow part 300 to rise, thereby moving projection 205 into the engaged position where it seats in depression 420 on the lower face of the module. As soon as the trigger has been squeezed sufficiently for the stepped portion of pawl 240 to lock against the trigger, trigger 230 is locked in the engaged position.

With the tool clamped to a module, a communication link can then be established between the tool and the module. Interrogation is initiated by a user pressing a button 120 on the front panel of the tool. Preferably the link between the module and tools is optical, such as infra-red, to avoid compromising electrical screening of the module. The tool interrogates a module to which it is coupled to determine various information about it. This includes whether the module as a whole, or particular parts of the module, is faulty or working, and whether it is commissioned i.e. in service, or decommissioned i.e. out of service. Further information may relate to the configuration of the module, such as the number of lines being served and the capacity of those lines. It will be appreciated that other information could be conveyed.

Where a module has developed a fault, it may only be a minor part of the module which is faulty, which affects a small proportion of the total number of subscribers served by that module. When a module is correctly identified as being faulty there is a danger a technician will remove the module before it has been properly decommissioned, or taken out of service. Decommissioning involves distributing subscribers of the faulty module among alternative modules.

Figure 5:
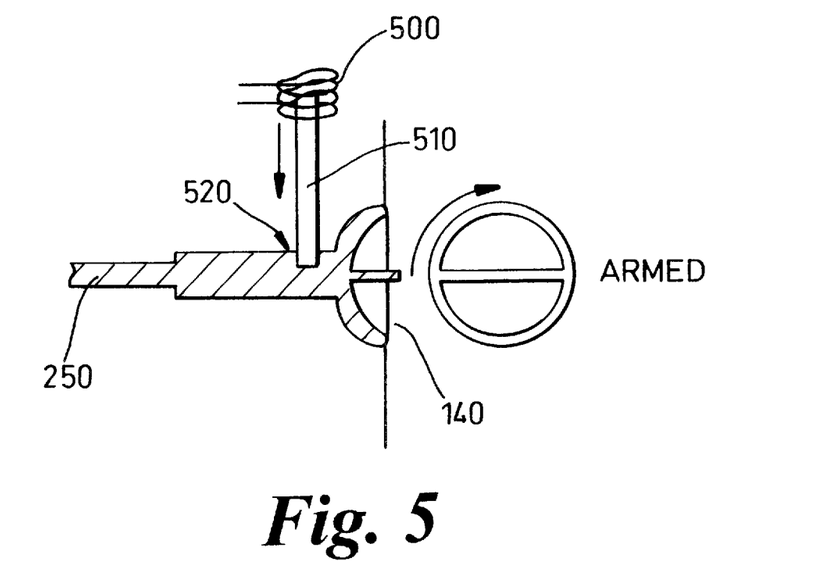
FIG. 5 shows an interlock mechanism used in the tool of FIGS. 1 to 4 in an armed state.
Figure 6:
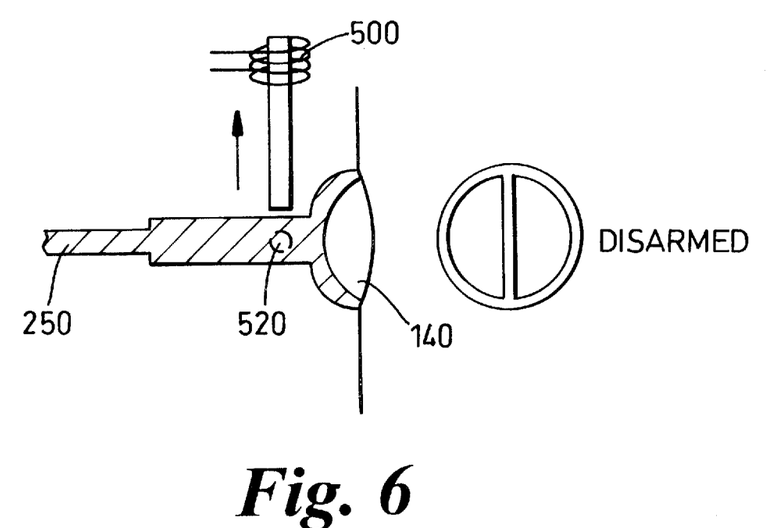
FIG. 6 shows the interlock mechanism of FIG. 5 in a disarmed state.

FIGS. 5 and 6 show an interlock mechanism used in the tool. Control 140 on the front panel of the tool is linked to a key shaft 250 which locates in a lock on a front panel of a module. Movement of a pin 510 is controlled by a coil 500. In an armed state, shown in FIG. 5, pin 510 locates in a depression 520 in shaft 250 to prevent turning of the key. In a disarmed state, shown in FIG. 6, pin 510 is withdrawn from shaft 250 to allow a user to turn control 140 and operate key shaft 250.

Figure 7:
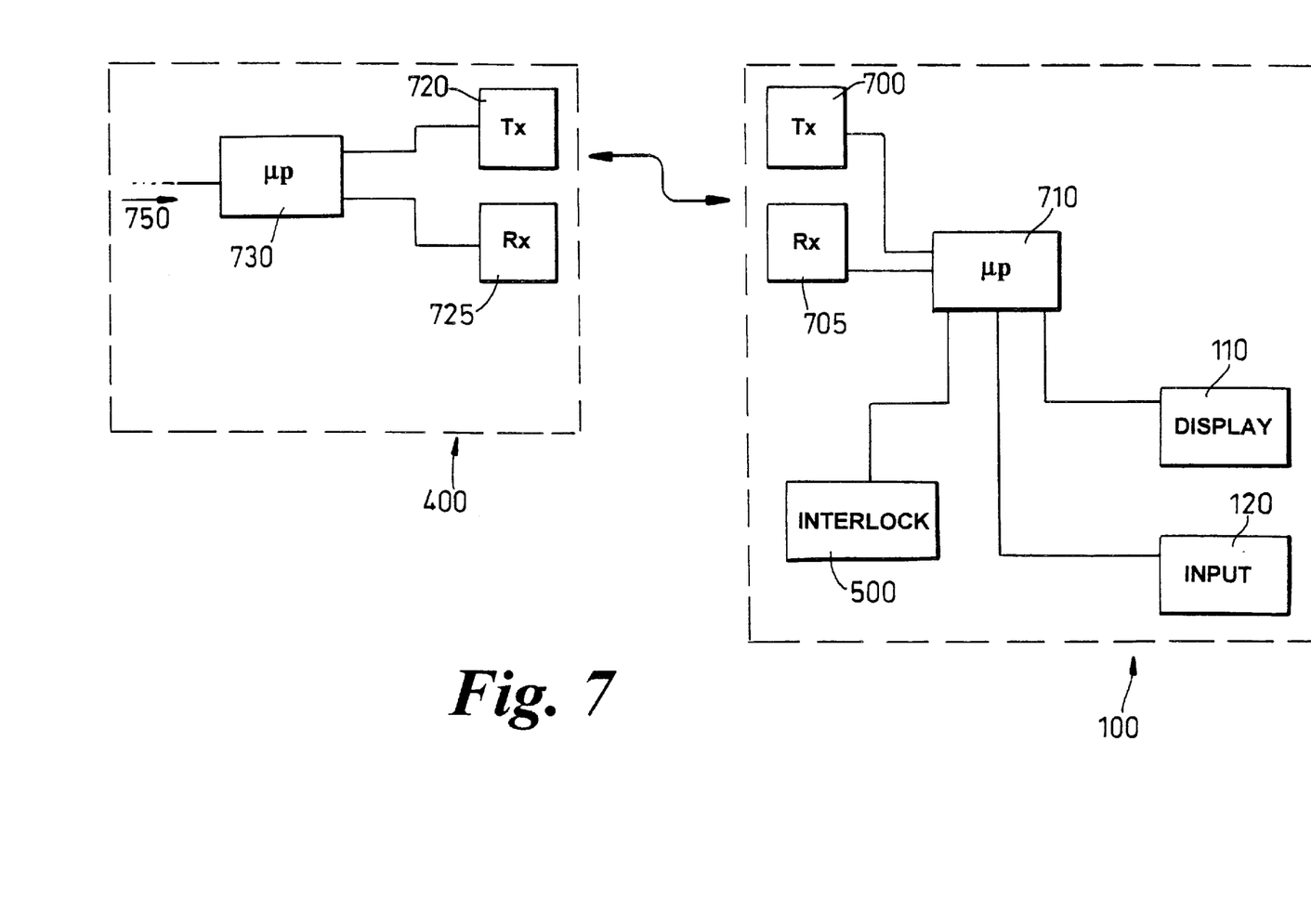
FIG. 7 is a block diagram of circuitry in the tool.

FIG. 7 is a block diagram of circuitry within the tool 100 and module 400. A microprocessor 710 couples to the main functional blocks within the tool. Input button(s) 120 supply input signals to the microprocessor and display 110 receives output signals from the microprocessor for providing information to a user. The buttons can be soft keys which are positioned adjacent display 110 so that the buttons are labelled with different functions according to the task which is required, e.g. configuration of a module, decommisioning of a module. Transmitter 700 and receiver 705 are preferably infra-red devices which transmit interrogation signals to and receive replies from corresponding transmitter 720 and receiver 725 devices in module 400. Interlock control coil 500 receives a control signal from microprocessor 710 so as to allow or prevent a user from operating the key to unlock a module. The tool has an internal power supply such as a rechargeable Ni Cad battery.

Module 400 has a microprocessor which receives via connection 750 information from other circuits on the module about status, such as whether the module as a whole or particular parts of the module are faulty or working, commissioned i.e. in service, or decommissioned i.e. out of service. This information can be transmitted to the tool when interrogated.

Figure 8:
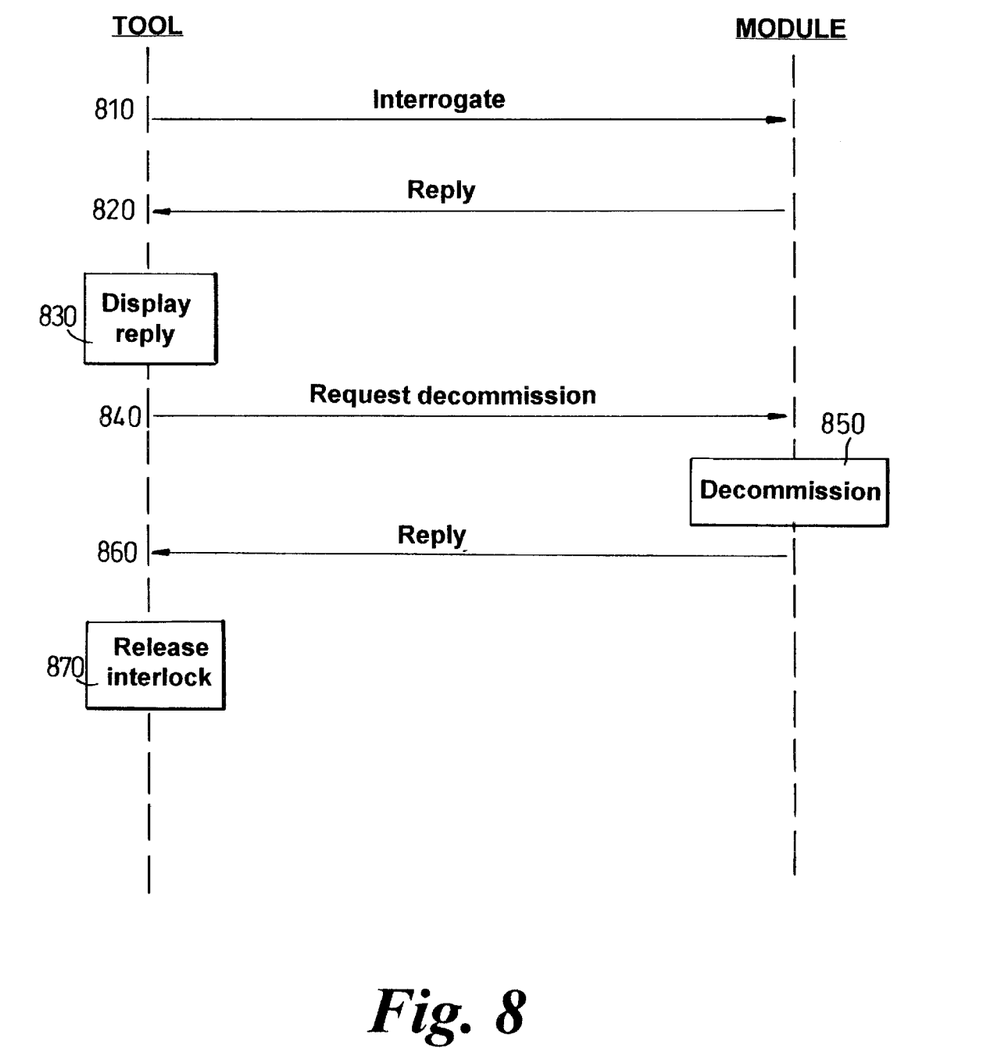
FIG. 8 is a flow diagram of an exemplary communication protocol between the tool and a module.

FIG. 8 is a flow diagram of a preferred form of communication between the tool and a module. Firstly, the tool interrogates 810 the module. The module replies 820 with various information about itself which is displayed 830. A technician can readily assess from this information whether he has chosen the correct module to remove.

If the user has correctly identified a faulty module, he can request that the module be decommissioned, by pressing a control on the tool. An interlock in the tool which couples an unlocking control on the tool to a key at the module-facing side of the tool is operable at this stage to inhibit the key until receipt of a reply from the module indicating that decommissioning is complete. Decommissioning occurs in step 850. This may involve dialogue between the module and a network manager to redistribute the traffic which the module is handling. If the module is not faulty, or if decommissioning cannot be achieved, a negative reply is returned at this stage to inhibit unlocking of the module. When decommissioning is successfully completed, and it is safe to remove the module, a reply 860 is sent to the tool. The interlock in the tool is released 870 in response to this reply. A user may then operate the unlocking control 140 on the tool. Control 140 couples to a key on the module-facing side of the tool which engages with a corresponding lock on the module. This unlocks the module from its support frame. With the module unlocked a user can pull on grip 130 to withdraw the module from the rack.

So far an embodiment of the invention has been described where an interlock is incorporated into the tool, and receipt of a message from a module indicating that decommissioning is complete is used to release the interlock to allow a user to operate control 140 to turn key 250. An alternative is to incorporate the interlock into the module. An interlock similar to that shown in FIGS. 5 and 6 controls movement of the mechanical lock elements in the module. A control coil to arm or disarm the interlock is coupled to the module microprocessor 730. Referring to the flow diagram of FIG. 8, the stages up to point 840 are the same. At stage 850 the module performs decommissioning and releases it's interlock. Reply 860 informs the tool that decommissioning is complete and that the user may use unlocking control 140 on the tool to unlock the module from its supporting frame.

The process of decommissioning and removing a module has been described in detail, where the tool is fitted to a module which is already installed in a support frame for the purpose of decommisioning and removing the module. The tool may also be used to install and commission a module. The tool is fitted to a module, e.g. while the module is still resting in it's transit packaging box. The module is withdrawn from the box, by the tool, and fitted in a required place on a support frame. Buttons 120 on the tool may be used to configure the module, a technician following prompts on display 110 generated by a program running on microprocessor 710. Transmitter 700 transmits the configuration information, such as software configuration information, to the module, where it is stored in a memory associated with the module's microprocessor 730. Before or during the configuring process information may be transmitted from the module to the tool to allow appropriate configuration information to be delivered to the module.

I claim:

1. A tool for use in manipulating telecommunications modules, the tool comprising a housing having a grip for allowing a user to grasp the tool, engagement means for engaging with a module so as in use to securely grasp the module and a transmitter/receiver unit for transmitting signals to and receiving information from the module, the tool further comprising a control for allowing a user to request decommissioning of the module to which it is engaged, the tool being arranged to receive a reply from a module indicating that decommissioning is complete.

2. A tool according to claim 1 wherein the modules are adapted to lock to a support structure, the tool further comprising means to unlock the module to which it is engaged from the support structure.

3. A tool according to claim 1 further comprising a display for displaying the information received from the module.

4. A tool according to claim 1 wherein the information received from the module is indicative of faults in the module.

5. A tool according to claim 1 wherein the modules are adapted to lock to a support structure, the tool further comprising:

an unlocking control;

a key which is adapted to engage with a module; and an interlock mechanism which is operable to inhibit the key until receiving the reply from the module indicating that decommissioning is complete, whereupon the interlock is released to allow the user to unlock the module and remove it from the support structure.

6. A tool according to claim 1 wherein the transmitter/receiver unit transmits and receives wireless signals.

7. A tool according to claim 6 wherein the transmitter/receiver unit transmits and receives optical signals.

8. A tool according to claim 1 wherein the engagement means comprises a pair of projections on the tool which are adapted to mate with corresponding depressions on a module, one of the projections being retractable to allow the tool to be fitted onto the module.

9. A tool according to claim 8 wherein a trigger mechanism adjacent the handle controls movement of the retractable projection.

10. A method of manipulating a telecommunications module, which module is mounted on a support structure, using a tool comprising a housing having a grip for allowing a user to grasp the tool, engagement means for engaging with the module so as to securely grasp the module and a transmitter/receiver unit for transmitting signals to and receiving information from the module, the method comprising:

fitting the tool to the module;

requesting, via a control on the tool, decommissioning of the module;

receiving a reply from the module indicating that decommissioning is complete; and removing the module from the support structure.

* * * * *